(12) United States Patent
Grudl et al.

(10) Patent No.: US 7,950,713 B2
(45) Date of Patent: May 31, 2011

(54) VEHICLE SEAT

(75) Inventors: Peter Grudl, Julich (DE); Guido Herkenrath, Wuppertal (DE); Martin Zynda, Burscheid (DE); Andreas Gustavel, Dortmund (DE); Ralf Janisch, Burscheid (DE); Bernd Engels, Remscheid (DE); Andreas Irgang, Leichlingen (DE)

(73) Assignee: Johnson Controls GmbH, Burscheid (DE)

( * ) Notice: Subject to any disclaimer, the term of this patent is extended or adjusted under 35 U.S.C. 154(b) by 55 days.

(21) Appl. No.: 12/299,579

(22) PCT Filed: May 14, 2007

(86) PCT No.: PCT/EP2007/004278
§ 371 (c)(1),
(2), (4) Date: Apr. 3, 2009

(87) PCT Pub. No.: WO2007/131761
PCT Pub. Date: Nov. 22, 2007

(65) Prior Publication Data
US 2009/0302631 A1  Dec. 10, 2009

(30) Foreign Application Priority Data

May 12, 2006  (DE) .......................... 10 2006 022 732
Aug. 8, 2006  (DE) .......................... 10 2006 037 344

(51) Int. Cl.
*B60N 2/12* (2006.01)

(52) U.S. Cl. ..................................... 296/65.05; 297/313
(58) Field of Classification Search ................... 296/64, 296/65.05, 65.11, 65.12; 297/216.19, 341.11, 297/341, 311, 344.11; 248/424
See application file for complete search history.

(56) References Cited

U.S. PATENT DOCUMENTS

| 1,471,001 | A | 10/1923 | Nicholson | |
| 2,246,076 | A * | 6/1941 | Riley | 297/344.21 |
| 2005/0127645 | A1 * | 6/2005 | Smith et al. | 280/730.2 |

FOREIGN PATENT DOCUMENTS

DE  20102091 U1  6/2002
JP  07108864 A  4/1995

* cited by examiner

*Primary Examiner* — Glenn Dayoan
*Assistant Examiner* — Pinel E Romain
(74) *Attorney, Agent, or Firm* — Butzel Long

(57) ABSTRACT

A vehicle seat includes a seat part having a seat substructure. The seat part is displaceable along a transverse axis with respect to the seat substructure and the seat part is at least partially swivelably about the transverse axis. The seat includes a displacement element having a displacement length, a fixed lower part and an upper part. A first longitudinal movement of the seat part and a first transverse movement of the seat part occurs along a first section of the adjustment length. A second longitudinal movement of the seat part and a second transverse movement of the seat part occurs along a second section of the adjustment length. The ratio of the first longitudinal movement to the first transverse movement differs from the ratio of the second longitudinal movement to the second transverse movement.

16 Claims, 4 Drawing Sheets

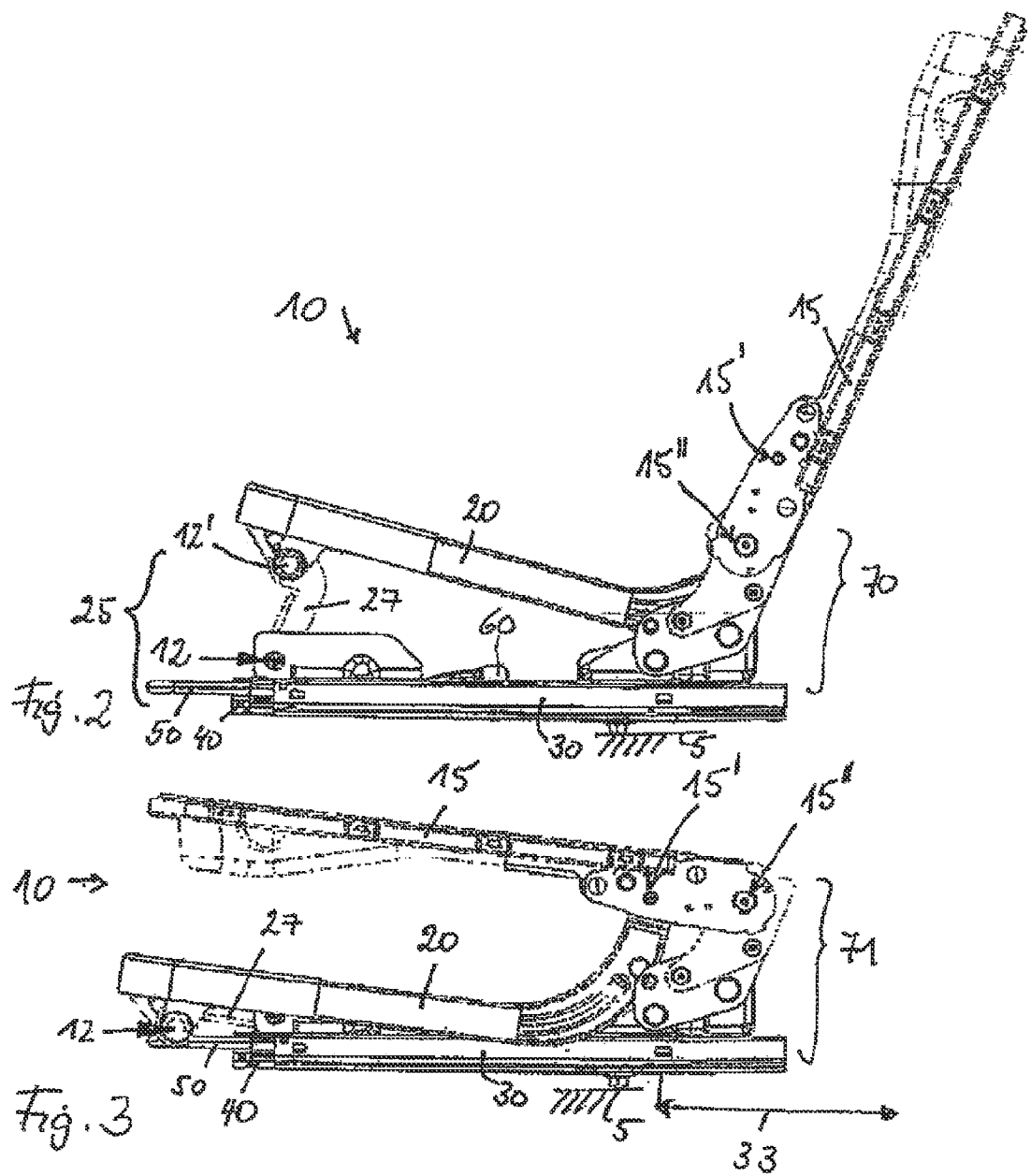

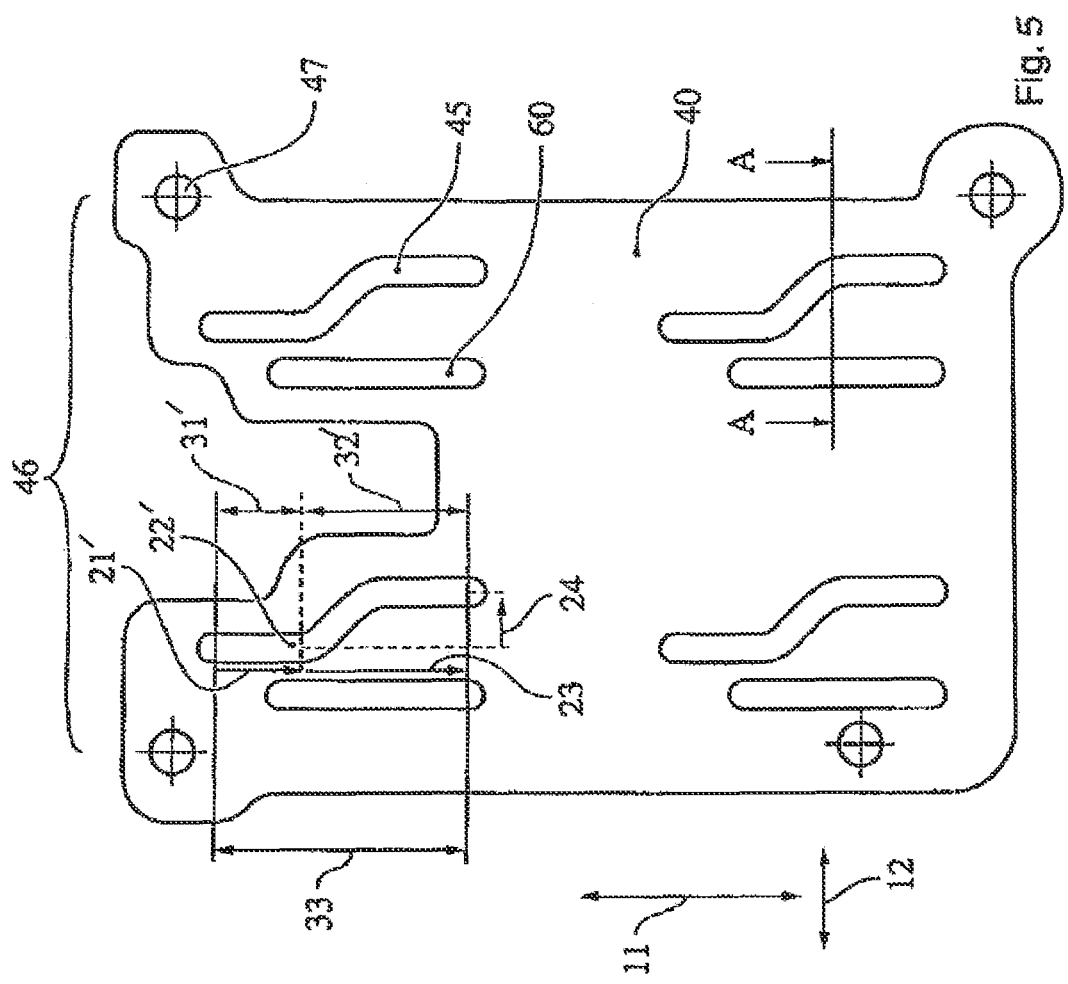

VEHICLE SEAT

CROSS REFERENCE TO RELATED APPLICATIONS

The present application is National Stage filing of International Application No. PCT/EP2007/004278, filed on May 14, 2007, titled "Seat Arrangement for a Vehicle" which claims priority to German Patent Application No. DE 10 2006 022 732.8, filed May 12, 2006, and German Patent Application No. DE 10 2006 037 344.8, filed Aug. 8, 2006 the entire disclosures of which are incorporated herein by reference.

BACKGROUND

The present disclosure relates to a seat for a vehicle, and more particularly to a seat having a seat part that is displaceable relative to the vehicle.

Vehicles include seats that are multipositional. For example, a vehicle seat that is movable in a non-rectilinear manner is known. However, no other positional change of the seat part—for example, to a folded position—is provided without the use of additional components. Another example of a seat bench arrangement for vehicles is known in which the seat bench arrangement has at least two partial seats arranged side by side in the vehicle and is displaceable with respect to a floor structure, the partial seats each being displaceable on a guide track which is disposed obliquely with respect to a longitudinal axis running in the direction of travel of the vehicle. This arrangement has the disadvantage that only straight movements are possible, and not a curved movement or displacements of the partial seat. Thus there is a need in the art for a vehicle seat that is displaceable in multiple positions in a compact manner.

SUMMARY

Accordingly, a seat arrangement for a motor vehicle is provided that offers flexible adjustability of the vehicle seat, or of the seat part in a simple manner and the seat arrangement can nevertheless be produced such that it is comparatively light, robust and inexpensive.

A seat includes a seat part and a seat substructure, the seat arrangement having a transverse axis extending substantially parallel to a transverse axis, the seat part being provided displaceably with respect to the seat substructure along the transverse axis and the seat part being provided swivelably at least partially about the transverse axis.

The seat arrangement further includes a displacement element having a lower part arranged in a fixed position with respect to the vehicle and an upper part. The seat part is longitudinally displaceable parallel to a vehicle longitudinal axis and transversely parallel to a transverse axis extending transversely to the vehicle longitudinal axis on a first partial section of the adjustment length. A second longitudinal movement of the seat part parallel to the vehicle longitudinal axis and a second transverse movement of the seat part parallel to the transverse axis occurs along a second partial section of the adjustment length. The ratio of the first longitudinal movement to the first transverse movement is different than the ratio of the second longitudinal movement to the second transverse movement.

A rod is arranged along the transverse axis, and the seat part is connected to the rod by at least one articulated arm. The displacement of the seat part in a lateral direction may be combined with a folding forward of the seat part for a loading position. An articulated arm is provided rotatably around the rod and displaceably along the rod.

The displacement element includes a guide slot and a pin which is movable in the guide slot. Guidance of the adjustment movement or displacement movement of the seat arrangement along the adjustment length is thereby implemented in a simple manner.

In another example of a seat arrangement, the displacement element is a guide rail, the guide rail having an upper rail and a lower rail.

In another example of a seat arrangement, the lower part includes an adjustment plate firmly connected to a floor assembly of the vehicle.

BRIEF DESCRIPTION OF THE DRAWINGS

FIG. 1b is a perspective view of a displacement element for the seat of FIG. 1a.

FIG. 2 is a side view of the seat of FIG. 1 in a normal position of the seat;

FIG. 3 is a side view of the seat in a folded position;

FIG. 4 is a side view of a second embodiment of a seat with a seat part and a displacement element;

FIG. 5 is a top view of a lower part of the seat of FIG. 4;

FIG. 6 is a cross section through a portion of the lower part for the seat of FIG. 5;

DETAILED DESCRIPTION

Figure 1A:
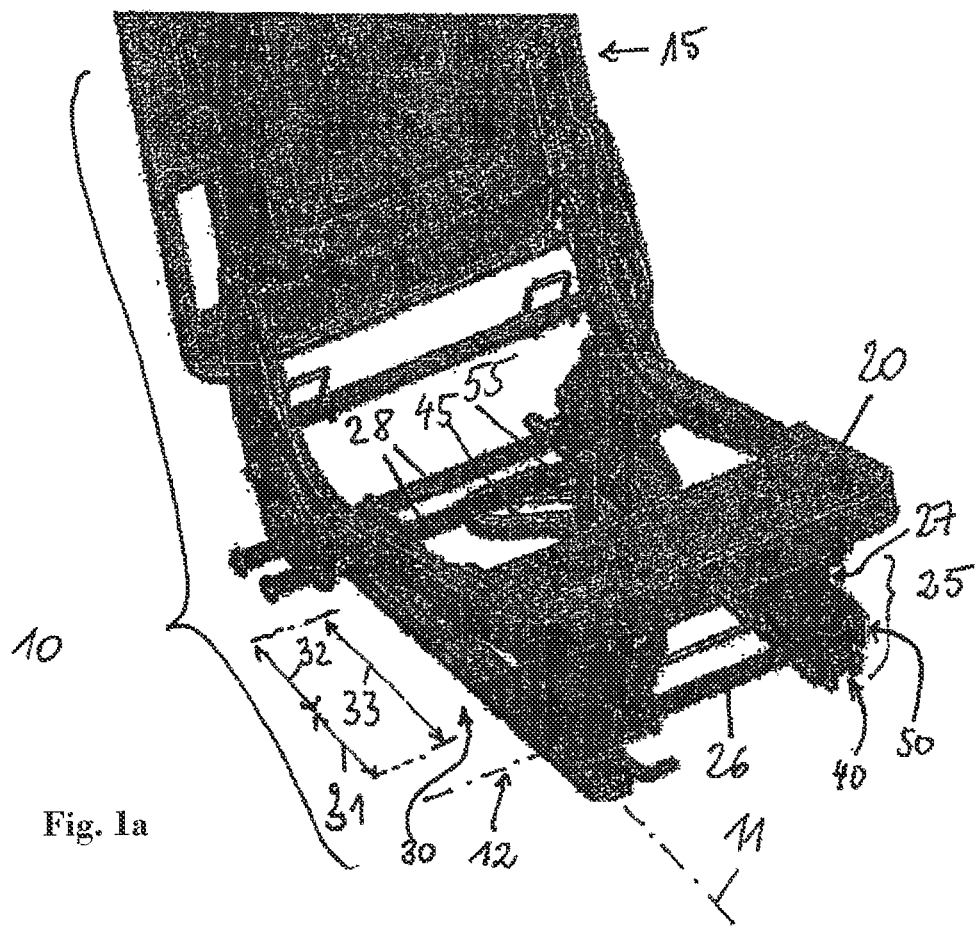
FIG. 1a is a perspective view of a first embodiment of a seat.

FIG. 1a is a perspective representation of a first embodiment of a seat arrangement 10 according to the invention. The seat 10 includes a seat part 20 and a backrest part 15, the backrest part 15 being connected movably, for example adjustably for inclination, to the seat part 20. A seat substructure 25 is connected to the floor assembly 5 of the vehicle using a displacement element 30 for displacing the seat part 20 with respect to the floor assembly 5 of the vehicle. The displacement element 30 includes a lower part 40 fixed with respect to the vehicle and also an upper part 50. Furthermore, the displacement element 30 defines an adjustment length 33. The seat part 20 of the seat 10 can be displaced or adjusted along the adjustment length 33 using the displacement element 30. The adjustment length 33 includes a predetermined length, having a defined starting point and a defined end point. In this example, the adjustment length 33 is not substantially longer than the extension of the seat 10 along a seat longitudinal axis 11, or along the vehicle longitudinal axis 11. An example of the adjustment length 33 is approximately 500 mm or less. In another example, the adjustment length 33 is approximately 250 mm or less. For defined adjustment of the total adjustment movement, the seat substructure 25 has a displacement element 30 which includes a lower part 40, which is fixed with respect to the vehicle, and an upper part 50. The lower part 40 may be connected to the vehicle, such as directly or via the floor assembly 5. For example, the lower part includes a guide slot 45. A pin 55 may be connected to the seat part 20, and therefore defines the movement of the seat part 20 within the guide slot 45 during a movement of the seat part 20 along the adjustment length 33. A first longitudinal movement 21 of the seat part 20 and a first transverse movement 22 of the seat part 20 are provided on a first partial section 31 of the adjustment length. A second longitudinal movement 23 and a second transverse movement 24 of the seat part 20 correspond to a second partial section 32 of the adjustment length 33. A guide slot 45 within the first partial section 31 of the adjustment length 33 runs parallel to the vehicle longitudinal axis 11 or parallel to the seat longitudinal axis 11. For example, the first longitudinal movement 21 corresponds to the first partial section 31 and the first transverse movement 22 is zero. In this example, for the movement of the seat part 20 along the second partial section 32 of the adjustment length 33, the second longitudinal movement 23 corresponds to the length of the second partial section 32 along the vehicle longitudinal axis 11. The second transverse movement 24 of the seat part 20 corresponds to the extension of the guide slot 45 in the transverse direction 12, such that the second transverse movement is not reduced. For a complete displacement of the seat part 20 over the full adjustment length 33, the seat part 20 follows a non-rectilinear movement path. As a result, the ratio of the first longitudinal movement 21 to the first transverse movement 22 differs from the ratio of the second longitudinal movement 23 to the second transverse movement 24. The adjustment of the seat part 20 along the adjustment length 33 therefore does not take place rectilinearly. For example, there may be a kink or curvature or S-shaped or otherwise nonlinear movement of the seat part 20. The pin 55 may be movable in the guide slot 45, such as slidingly or by rolling, such as with a ball bearing, not shown, which, for example, runs along the wall of the guide slot 45. Therefore, free-running displacement may be achieved.

Figure 1B:
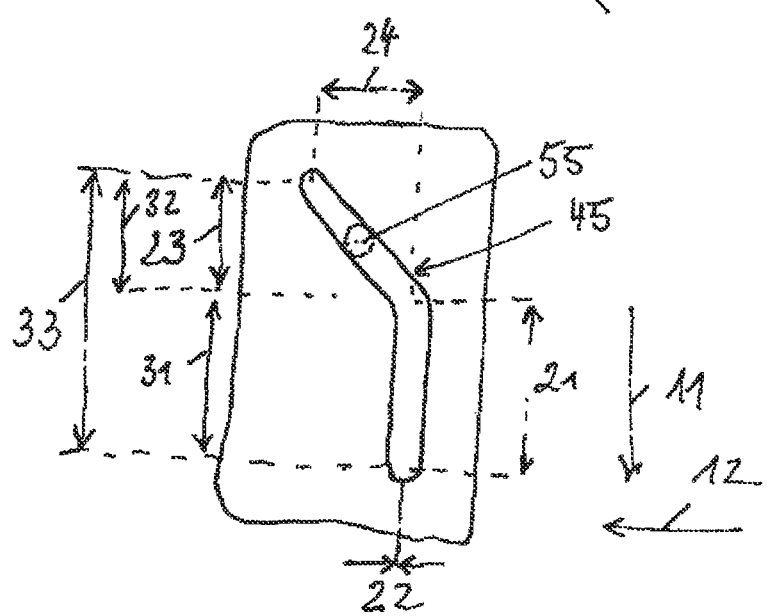

The seat arrangement 10 has a transverse axis 12 extending transversely to the seat longitudinal axis 11. The seat part 20 may be displaceable along the transverse axis 12 with respect to the seat substructure 25, and at least partially swivelably about the transverse axis 12. In the first embodiment shown in FIG. 1, a rod 26 may be arranged parallel to the transverse axis 12, and the seat part 20 may be connected to the rod 26 by at least one articulated arm 27. The articulated arm 27 is connected at one end to the seat part 20, such as to the front portion of the seat part 20, and at its other end to the rod 26. Therefore, the articulated arm 27 can rotate or swivel relative to the rod 26 about the transverse axis 12 and the articulated arm 27 is displaceable along the rod 26 in the direction of the transverse axis 12. The articulated arm 27 may include a bushing through which the rod 26 passes.

FIG. 2 is a schematic side view of the seat 10 adjusted in a normal position 70. FIG. 3 shows the seat 10 represented in FIG. 1, in a folded position 71. As compared to the normal position 70, in the folded position the backrest 15 is folded forwards in the direction of the transverse axis 12, or in the direction of the seat part 20. The seat part 20 is connected to the backrest part 15 at a first articulation point 15', which is arranged a distance from a second articulation point 15" forming the pivot axis of the backrest 15. The seat part 20 may be displaced forwardly as the backrest 15 is swiveled forwards, the articulated arm 27 is swiveled about the transverse axis 12, and the seat part 20 is swiveled at least partially about the transverse axis 12. This causes the seat part 20 to be lowered as it is swiveled, so that the backrest part 15 is adjustable to a comparatively low position. A rear surface of the backrest part 15 forms a loading area, which is flat. In addition, the seat part 20 can be separated from the backrest 15' in the region of the first articulation point 15' and is completely swivelable forward about the transverse axis 12 (not illustrated). It may further be provided that after an adjustment to the folded position (FIG. 3) the seat part 20 can be swiveled together with the backrest 15 about the transverse axis 12, in order to achieve improved loading or a larger luggage capacity.

The articulated arm 27 may be swivelable at one end about the transverse axis 12 and therefore around the rod 26. At its other end the articulated arm 27 may be swivelable with respect to the seat part 20 about a second transverse axis 12'. In another example, the rod 26 is arranged at the location of the second axis 12' and the articulated arm 27 has a bushing positioned on the second axis 12', and the articulated arm 27 is displaceable along the rod 26 parallel to the second axis 12', and is rotatable or swivelable about the latter. Thus, the portion of the seat part 20 which is displaceable transversely to the seat longitudinal axis 11 can be made smaller, so that comfort during displacement of the seat part 20 can be increased.

The seat 10 may includes a locking element 60. An example of a locking element 60 is a conventional latching rail or a toothed rail with corresponding blocking catches. The toothed rail may be connected to the lower part 40 and the blocking catches can be locked to the toothed rail from the side of the upper part 50. In this, the path of the locking element 60 corresponds substantially to the predetermined path of the displacement element 30. In another example, the path of the locking element 60 may be rectilinear, with the upper part 50 moving relative to the seat part 20 as it moves along the adjustment length 33.

Parallel to the first transverse axis 12 or to the second axis 12', a rod-like slide element 28 may be located in the rear portion of the seat arrangement 10, so that the seat part 20 is displaceable relative to the upper part 50 of the displacement element 30 parallel to the first transverse is axis 12.

FIG. 4 is a schematic side view of another embodiment of the seat 10 for a vehicle. Like features have like reference numerals. The seat 10 similarly includes the seat part 12 and the backrest 15 connected movably to the seat part 20. In this example, the seat part 20 is connected to the floor assembly 5 of the vehicle by the displacement element 30. Using the displacement element 30, the seat part 20 can be displaced with respect to the floor assembly 5 of the vehicle. For this purpose, the displacement element 30 has the lower part 40 fixed with respect to the vehicle and also the upper part 50. Furthermore, the displacement element 30 defines the adjustment length 33. The seat part 20 of the seat 10 can be displaced or adjusted along the adjustment length 33 via the displacement element 30. In this example, the adjustment length 33, or the adjustment range of the displacement element 30, does not form a rectilinear displacement path but, at least in a partial region, forms a non linear, such as a kinked or curved or the like adjustment length. In this example, displacement paths or adjustment lengths of any desired shape may be utilized. For example, paths which have a straight section and a non linear region, or paths which have only nonlinear sections may be achieved. Also in this example, during displacement of the seat part 20 no rotation of the seat part 20 occurs, such as about a substantially vertical axis of rotation, but that the rotational position of the seat part 20 remains constant relative to the vehicle.

FIG. 5 shows a displacement element 30 with reference to a schematic top view of the lower part 40. In this example, the lower part 40 includes an adjustment plate 46. The adjustment plate 46 may be internally formed with the lower part 40. In an example, a plurality of guide slots 45 may be formed in the adjustment plate 46. In another example, a single guide slot 45 is formed in an adjustment plate 46. The adjustment plate 46 may be connected to the floor assembly 5 of the vehicle at fastening points 47.

The adjustment length 33, which corresponds substantially to the usable length of the guide slot 45, is shown in FIG. 5. In this example, the first partial section 31 of the adjustment length 33 and the second partial section 32 of the adjustment length 33 are shown. In operation, if an element of the upper part 50 (not shown) moves in the guide slot 45 on the first partial section 31 of the adjustment length 33, a movement of the seat part 20 takes place only in the direction of the vehicle longitudinal axis 11, that is, parallel to the vehicle longitudinal axis 11. Similarly, if the seat 10 is moved on the second partial section 33, a movement of the seat part 20 takes place not only in the direction of the vehicle longitudinal axis 11 but also in the direction of a first transverse axis 12 running transversely to the vehicle longitudinal axis 11. On the first partial section 31 of the adjustment length 33, therefore, a first longitudinal movement 21 of the seat part 20 and a first transverse movement 22 of the seat part 20 can be obtained. The first longitudinal movement 21 corresponding to the first partial section 31 and the first transverse movement 22 is minimal or zero whereby the first partial section 31 of the adjustment length 33 runs parallel to the vehicle longitudinal axis 11. With regard to the movement of the seat part 20 on the second partial section 32 of the adjustment length 33, the second longitudinal movement 23 corresponds to the length of the second partial section 32 along the vehicle longitudinal axis 11. Similarly, the second transverse movement 24 of the seat part 20 corresponds to the extension of the adjustment length 33 along the transverse axis 12, and does not disappear. Accordingly, the ratio of the first longitudinal movement 21 to the first transverse movement 22 differs from the ratio of the second longitudinal movement 23 to the second transverse movement 24. Thus, the adjustment length 33 of the displacement element 30 is not completely rectilinear but that at least one nonlinear portion, such as a kink or curvature or S-shaped or the like configuration of the adjustment length 33, is present.

The seat 10 further includes the locking element 60, such as a conventional latching rail or a toothed rail with corresponding blocking catches. In this example, the toothed rail may be connected to the lower is part 40 and the blocking catches can be locked to toothed rail from the side of the upper part 50. In this example, either the path of the locking element 60, such as the toothed rod or a similar device corresponds substantially to the path of the displacement element 30 along its curvature or kink. The path of the locking element 60 in another example may be rectilinear, so that at least one element of the locking element 60, such as a blocking catch executes a relative movement with respect to the upper part 50 or to the seat part 20 as it moves along the adjustment length 33. As shown in FIG. 5 entire upper part 50 of the displacement element 30 moves together with the seat part 20 along the guide slot 45. As a result, the upper part 50 is provided fixedly with respect to the seat part 20, that is, no relative movement takes place between the two elements.

Therefore, for both the first and second examples of the seat 10, and in the third example of the seat arrangement 10 described later, that locking in at least one or more locking positions, is possible along the adjustment length via the locking element 60.

FIG. 6 is a schematic sectional view along the section line A-A through the adjustment plate 46 and through the lower part 40. The pin 55, which forms part of the upper part 50 of the seat 10 or of the displacement element 30, is guided in a longitudinally movable manner that is perpendicular to the drawing plane in FIG. 6 in the guide slot 45 of the lower part 40. If the arrangement according to the seat 10 shown in FIG. 5 is selected, a relative movement of at least a part of the locking element 16 occurs with respect to the seat part 20 or to the upper part 50 since the path of the locking element 60 does not correspond to the path of the guide slot 45.

Figure 7:
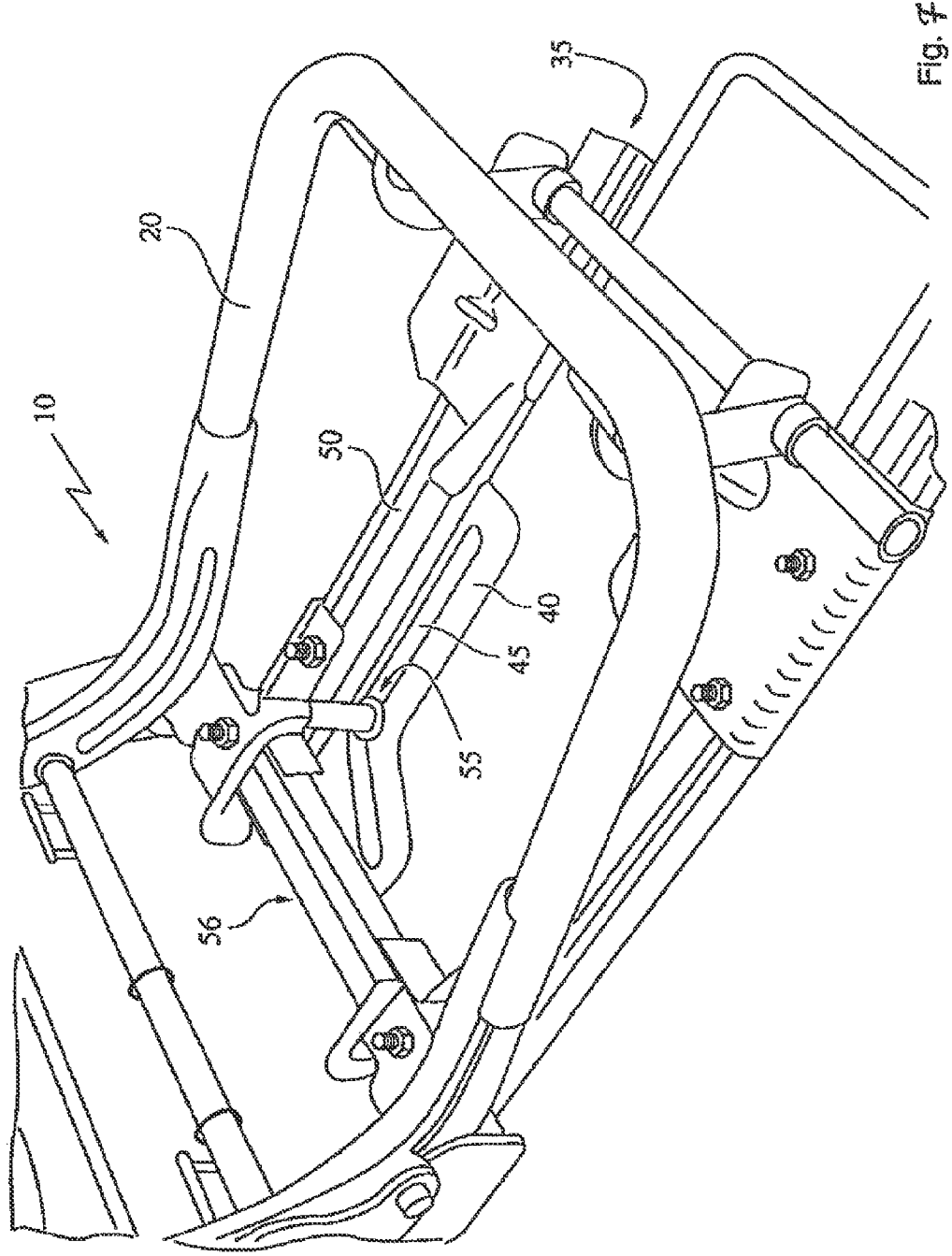
FIG. 7 is a perspective representation of a third embodiment of the seat with the seat part.

FIG. 7 is a perspective view of a third example of the seat 10. Like features have like reference numerals. The seat 10 includes the seat part 20, which is represented only by a frame element. A guide rail 35 conventionally used for seat adjustment including an upper rail and a lower rail, is provided as the displacement element 30. In this example, the upper rail is integral to the upper part 50 and the lower rail is integral to the lower part 40. The guide slot 45 also forms part of the lower part 40 and is therefore connected, such as to the lower rail of the guide rail 35. This connection may be effected either directly, for example integrally or by using a connecting element, or indirectly by using a fastening of both the lower rail and the part of the lower part 40. The lower part 40 includes the connection of the guide slot 45 to the floor assembly 5 of the vehicle. In this example, the upper part 50 moves only rectilinearly along the longitudinally disposed guide rail 35, while the seat part 20 is arranged displaceably relative to the upper part 50. However, the relative movement of the seat part 20 with respect to the upper part 50 takes place in a direction transverse to the adjustment direction that may coincide with the vehicle longitudinal axis 11 of the guide rail 35. The upper part 50 has a transverse member 56 along which the seat part 20 is displaceable transversely. In this example, the pin 5 running in the guide slot 45 is connected to the seat part 20 and can therefore be moved along the transverse member 56. This movement may be oriented along the transverse axis 12.

What is claimed is:

1. A seat for a vehicle comprising:
    a seat part positioned with respect to a seat forward and rearward longitudinal axis and a transverse axis of the seat;
    a seat substructure connected to the seat part wherein the seat part is displaceable along the transverse axis with respect to the seat substructure and the seat part is partially swivelably about the transverse axis;
    a displacement element, having a lower part which is fixed and an upper part for displacing the seat part over a displacement length, wherein a first longitudinal movement of the seat part parallel to the seat longitudinal axis and a first transverse movement of the seat part parallel to the transverse axis extending transversely to the vehicle longitudinal axis along a first partial section of the adjustment length, and a second longitudinal movement of the seat part parallel to the seat longitudinal axis and a second transverse movement of the seat part parallel to the transverse axis along a second partial section of the adjustment length wherein the displacement element displaces the seat part such that the ratio of the first longitudinal movement to the first transverse movement differs from the ratio of the second longitudinal movement to the second transverse movement.

2. The seat as set forth in claim 1, further comprising a rod arranged along the transverse axis, and the seat part is connected to the rod by an articulated arm.

3. The seat as set forth in claim 2 wherein the articulated arm is both rotatable and displaceably along the rod.

4. The seat as set forth in claim 3, wherein the seat part is adjustable to a normal position and to a folded position, and the articulated arm swivels about the rod between the normal position and the folded position of the seat part.

5. The seat as set forth in claim 1 wherein the displacement element has a lower part which is fixed with respect to the vehicle and an upper part, and the seat part moves with respect to the upper part through the first partial section or the second partial section.

6. The seat as set forth in claim 1 further comprising a locking element for fixing the seat arrangement in at least one locking position along the adjustment length.

7. The as set forth in claim 1 wherein the displacement element has a guide slot, and a pin is movable in the guide slot.

8. The seat as set forth in claim 1 wherein the displacement element is a guide rail having an upper rail part and a lower rail part.

9. The seat as set forth in claim 8 wherein the upper part moves with respect to the seat part is through the first partial section or the second partial section.

10. The seat as set forth in claim 9 wherein a locking element directly locks the upper part to the lower part.

11. The seat arrangement as set forth in claim 10 wherein the locking element moves with respect to the seat part through the first partial section or the second partial section, and the upper part is fixed with respect to the seat part.

12. The seat as set forth in claim 1 wherein the displacement element includes a guide rail having an upper rail and a lower rail, and the upper rail includes an upper part and the lower rail includes a lower part.

13. The seat as set forth in claim 12 wherein the lower part includes an adjustment plate which is rigidly connected to a floor assembly of the vehicle.

14. A seat for a vehicle comprising:
   a seat part positioned with respect to a seat forward and rearward longitudinal axis and a transverse axis of the seat;
   a rod positioned along the transverse axis, wherein the seat part is connected to the rod by an articulated arm that is both rotatable and displaceable along the rod;
   a seat substructure connected to the seat part, wherein the seat part is displaceable along the transverse axis with respect to the seat substructure and the seat part is partially swivelably about the transverse axis;
   a displacement element having a lower part which is fixed and an upper part which is moveable along a displacement length, wherein the lower part includes a guide slot having a first section and a second section, and a first longitudinal movement of the seat part parallel to the seat longitudinal axis and a first transverse movement of the seat part parallel to the transverse axis extending transversely to the vehicle longitudinal axis within the first section of guide slot, and a second longitudinal movement of the seat part parallel to the seat longitudinal axis and a second transverse movement of the seat part parallel to the transverse axis within the second section of the guide slot wherein the displacement element displaces the seat part, such that the ratio of the first longitudinal movement to the first transverse movement differs from the ratio of the second longitudinal movement to the second transverse movement.

15. The seat as set forth in claim 14 wherein the displacement element includes a guide rail having an upper rail and a lower rail, and the upper rail includes the upper part and the lower rail includes the lower part.

16. The seat as set forth in claim 15 wherein the lower part includes an adjustment plate which is rigidly connected to a floor assembly of the vehicle.

* * * * *